(12) United States Patent
Maruyama et al.

(10) Patent No.: US 12,208,544 B2
(45) Date of Patent: Jan. 28, 2025

(54) MATERIAL SUPPLY DEVICE AND PLASTICIZING APPARATUS

(71) Applicant: SEIKO EPSON CORPORATION, Tokyo (JP)

(72) Inventors: Hidenobu Maruyama, Nagano (JP); Kenta Anegawa, Nagano (JP); Asami Kajihara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/357,193

(22) Filed: Jul. 24, 2023

(65) Prior Publication Data

US 2024/0025081 A1    Jan. 25, 2024

(30) Foreign Application Priority Data

Jul. 25, 2022  (JP) .................................. 2022-117776

(51) Int. Cl.
*B29B 7/38* (2006.01)
*B29B 7/42* (2006.01)
*B29B 7/60* (2006.01)

(52) U.S. Cl.
CPC .............. *B29B 7/429* (2013.01); *B29B 7/38* (2013.01); *B29B 7/603* (2013.01)

(58) Field of Classification Search
None
See application file for complete search history.

(56) References Cited

U.S. PATENT DOCUMENTS 5,375,747 A * 12/1994 Yoshikawa ........ B65G 65/4836
239/689
2022/0055275 A1   2/2022 Maruyama et al.

FOREIGN PATENT DOCUMENTS

DE         10317824 A1 *  6/2004  ......... B65G 53/4633
JP         2022-036539 A    3/2022

* cited by examiner

*Primary Examiner* — Armand Melendez
(74) *Attorney, Agent, or Firm* — Global IP Counselors, LLP

(57) ABSTRACT

Provided is a material supply device that supplies a material to a plasticizing unit, the plasticizing unit being configured to plasticize the material to generate a plasticized material, the material supply device including: a housing having an inlet through which the material is fed into the plasticizing unit, and accommodating the material; and a rotary member provided above the inlet in the housing and configured to rotate around a rotation shaft intersecting a vertical direction. The material is accommodated above the rotary member in the housing, and the material is intermittently supplied to the inlet by the rotation of the rotary member.

1 Claim, 10 Drawing Sheets

MATERIAL SUPPLY DEVICE AND PLASTICIZING APPARATUS

The present application is based on, and claims priority from JP Application Serial Number 2022-117776, filed Jul. 25, 2022, the disclosure of which is hereby incorporated by reference herein in its entirety.

BACKGROUND

1. Technical Field

The present disclosure relates to a material supply device and a plasticizing apparatus.

2. Related Art

JP-A-2022-36539 discloses a plasticizing apparatus including a material supply mechanism capable of supplying a material to a plasticizing mechanism little by little. In this material supply mechanism, a rotary member having a plurality of through holes is provided above a communication hole coupling the material supply mechanism and the plasticizing mechanism. The material is supplied to the plasticizing mechanism through the through holes when the communication hole communicates with any of the through holes as the rotary member rotates in a horizontal plane.

In the plasticizing apparatus disclosed in JP-A-2022-36539, there is a problem that when the material enters between the rotary member and a member in the vicinity thereof, the entering material does not fall into the communication hole and the rotation of the rotary member is inhibited.

SUMMARY

A first aspect of the present disclosure provides a material supply device. The material supply device is a material supply device that supplies a material to a plasticizing unit, the plasticizing unit being configured to plasticize the material to generate a plasticized material, and the material supply device includes a housing having an inlet through which the material is fed into the plasticizing unit, and accommodating the material, and a rotary member provided above the inlet in the housing and configured to rotate around a rotation shaft intersecting a vertical direction. The material is accommodated above the rotary member in the housing, and the material is intermittently supplied to the inlet by the rotation of the rotary member.

A second aspect of the present disclosure provides a plasticizing apparatus. The plasticizing apparatus includes the material supply device and the plasticizing unit.

DESCRIPTION OF EMBODIMENTS

A. First Embodiment

Figure 1:
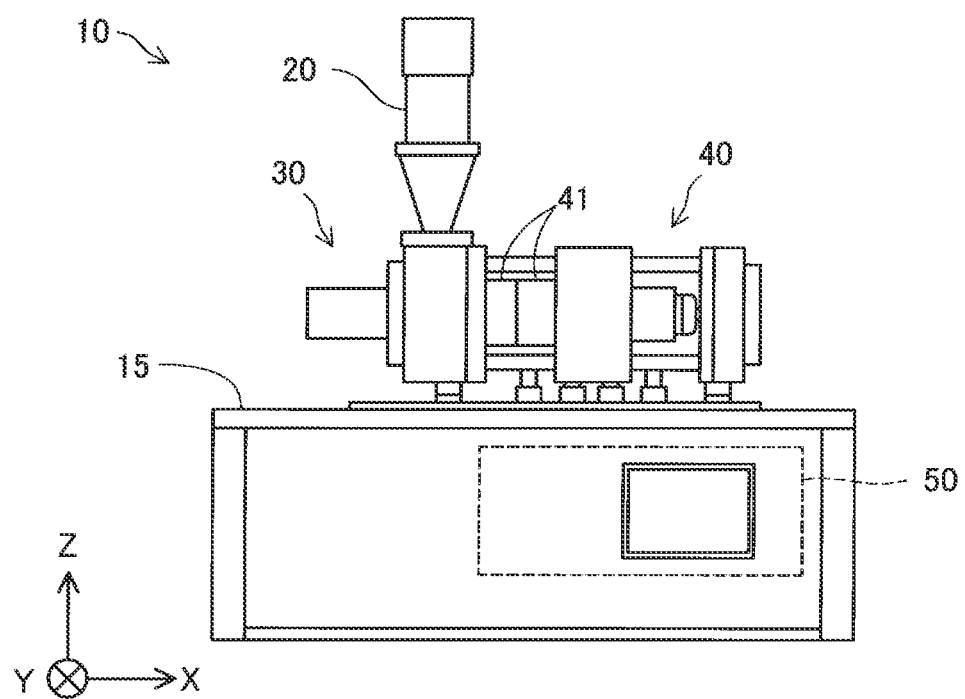
FIG. 1 shows a schematic configuration of an injection molding apparatus.

FIG. 1 shows a schematic configuration of an injection molding apparatus 10 according to the embodiment. FIG. 1 shows arrows indicating X, Y, and Z directions orthogonal to one another. The X direction and the Y direction are directions parallel to a horizontal plane. The Z direction is a direction parallel to a vertical direction. The X, Y, and Z directions in FIG. 1 and X, Y, and Z directions in other drawings indicate the same directions. When an orientation is identified, a positive direction that is a direction indicated by an arrow is set as "+", a negative direction that is an opposite direction of the direction indicated by the arrow is set as "−", and the positive and negative signs are used in combination for direction notation.

The injection molding apparatus 10 includes a material supply device 20, a plasticizing unit 30, a mold clamping device 40, and a control unit 50. The material supply device 20 is coupled to the plasticizing unit 30 from above. The plasticizing unit 30 and the mold clamping device 40 are fixed to a base 15. The base 15 includes the control unit 50. The injection molding apparatus 10 injects a plasticized material generated by the plasticizing unit into a mold 41 disposed in the mold clamping device 40 to form a molded product.

The control unit 50 is implemented by a computer including a CPU and a storage unit. The CPU includes one or more processors and a main storage device. The storage unit is implemented by an auxiliary storage device such as a hard disk drive. The control unit 50 controls operations of the material supply device 20, the plasticizing unit 30 and the mold clamping device 40 by executing programs stored in the storage unit by the CPU. The control unit 50 may be implemented by a circuit.

The material supply device 20 supplies a material of the molded product to the plasticizing unit 30. The material supply device 20 accommodates a pellet-shaped material. As the material, for example, a thermoplastic resin such as polypropylene resin (PP), polyethylene resin (PE), or polyacetal resin (POM) is used. The material supply device 20 is also referred to as a hopper. The material to be accommodated in the material supply device 20 may be, for example, powder that is pulverized by a pulverizer and has a non-uniform size or shape. The material supply device 20 will be described later in detail.

The plasticizing unit 30 plasticizes at least a part of the material supplied from the material supply device 20 to generate the plasticized material. In the present specification, "plasticization" is a concept including melting, and refers to changing from a solid state to a state of presenting fluidity. Specifically, in a case of a material in which glass transition occurs, the plasticization refers to setting a temperature of the material to be equal to or higher than a glass transition point. In a case of a material in which the glass transition does not occur, the plasticization refers to setting the temperature of the material to be equal to or higher than a melting point thereof. The material supply device 20 and the plasticizing unit 30 are collectively referred to as a plasticizing apparatus.

Figure 2:
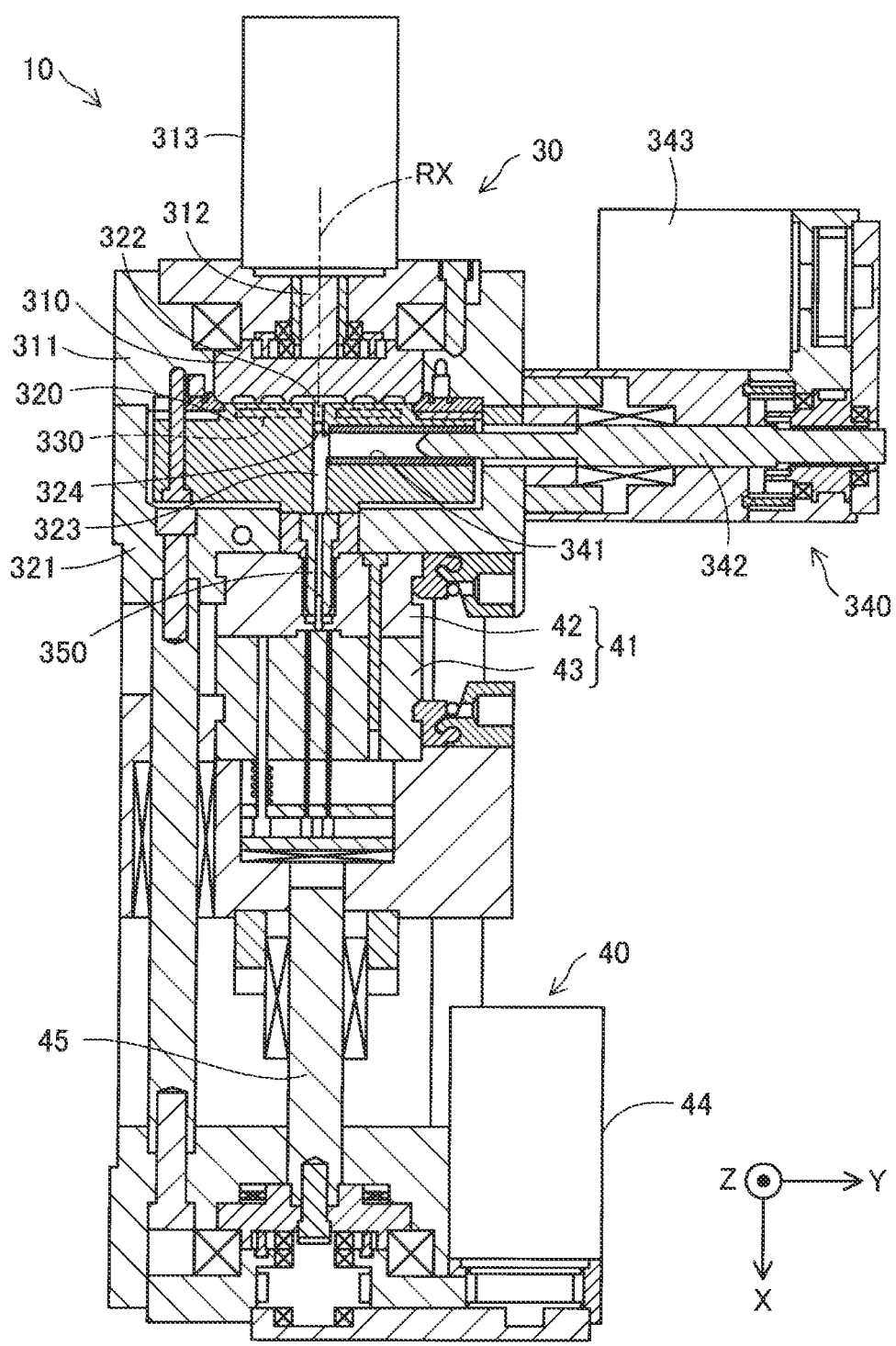
FIG. 2 is a cross-sectional view showing schematic configurations of a plasticizing unit and a mold clamping device.

FIG. 2 is a cross-sectional view showing schematic configurations of the plasticizing unit 30 and the mold clamping device 40.

The plasticizing unit 30 includes a flat screw 310, a barrel 320, a heating unit 330, and an aspiration delivery unit 340.

The flat screw 310 is accommodated in a screw case 311. The flat screw 310 is coupled to a drive shaft 312. The flat screw 310 rotates integrally with the drive shaft 312 by a driving force applied to the drive shaft 312 by a driving motor 313. A rotation axis RX of the flat screw 310 coincides with an axis of the drive shaft 312. An axial direction of the rotation axis RX of the flat screw 310 is a direction along the X direction. A rotational speed of the flat screw 310 is controlled by controlling a rotational speed of the driving motor 313 by the control unit 50. The flat screw 310 may be driven by the driving motor 313 via a speed reducer. The flat screw 310 is also referred to as a rotor or a screw.

The barrel 320 is provided on a +X direction side of the flat screw 310. The barrel 320 is accommodated in a barrel case 321. A communication hole 322 is formed in a center of the barrel 320. The communication hole 322 communicates with a flow path 323. An aspiration delivery cylinder 341 and a nozzle 350, which will be described later, are coupled to the flow path 323. In the flow path 323, a check valve 324 is provided upstream of the aspiration delivery cylinder 341. The check valve 324 prevents backflow of the plasticized material from a nozzle 350 side to a flat screw 310 side.

The heating unit 330 is provided inside the barrel 320. The heating unit 330 heats the barrel 320 and the aspiration delivery cylinder 341. A temperature of the heating unit 330 is controlled by the control unit 50. The heating unit 330 is, for example, a heater.

Figure 3:
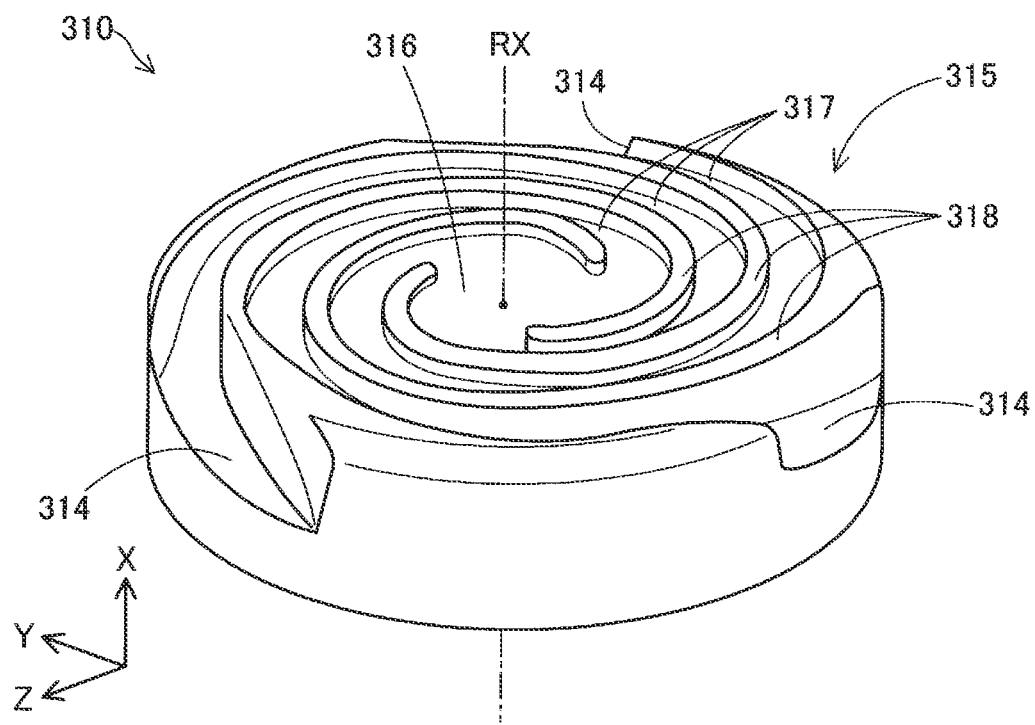
FIG. 3 is a perspective view showing a schematic configuration of a flat screw.

FIG. 3 is a perspective view showing a schematic configuration of the flat screw 310. The flat screw 310 has a substantially columnar shape whose length in a direction along the rotation axis RX is smaller than a length in a direction perpendicular to the rotation axis RX. On a groove forming surface 315 of the flat screw 310 facing the barrel 320, spiral grooves 317 are formed around a center portion 316. The grooves 317 communicate with material inlets 314 formed in a side surface of the flat screw 310. The material supplied from the material supply device 20 is supplied to the grooves 317 through the material inlets 314. The grooves 317 are formed by being separated by ridge portions 318. FIG. 3 shows an example in which three grooves 317 are formed, but the number of grooves 317 may be one, or may be two or more. A shape of the grooves 317 is not limited to a spiral shape, and may be a helical shape or an involute curve shape, or may be a shape extending in a manner of drawing an arc from the center portion 316 toward an outer periphery.

Figure 4:
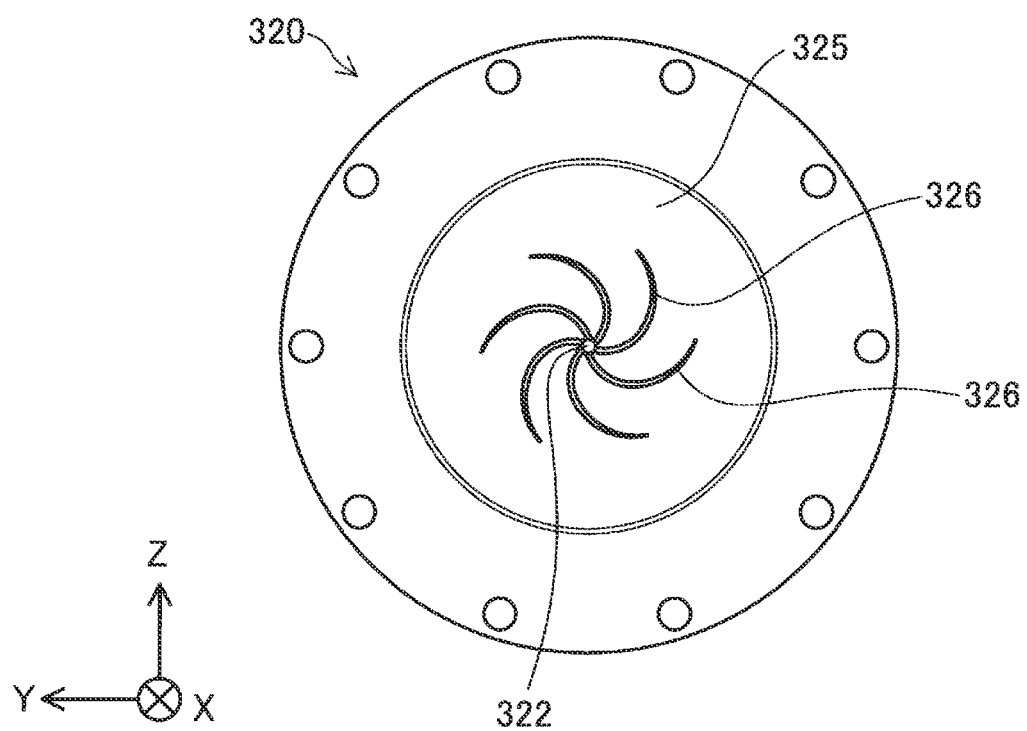
FIG. 4 is a schematic plan view of a barrel.

FIG. 4 is a schematic plan view of the barrel 320. The barrel 320 has a facing surface 325 facing the groove forming surface 315 of the flat screw 310 in a direction along the drive shaft 312. The communication hole 322 communicating with the flow path 323 is formed at a center of the facing surface 325. A plurality of guide grooves 326 coupled to the communication hole 322 and extending in a spiral shape from the communication hole 322 toward the outer periphery are formed in the facing surface 325. The guide grooves 326 may not be provided in the barrel 320. The guide grooves 326 may also not be directly coupled to the communication hole 322.

The material supplied to the grooves 317 of the flat screw 310 is plasticized between the flat screw 310 and the barrel 320 by the rotation of the flat screw 310 and the heating of the heating unit 330, flows along the grooves 317 and the guide grooves 326 by the rotation of the flat screw 310, and is guided to the center portion 316 of the flat screw 310. The material flowing into the center portion 316 flows out of the communication hole 322 provided at the center of the barrel 320.

As shown in FIG. 2, the aspiration delivery unit 340 includes the aspiration delivery cylinder 341, a plunger 342, and a plunger drive unit 343. The aspiration delivery unit 340 has a function of injecting the plasticized material in the aspiration delivery cylinder 341 into the mold 41. The aspiration delivery cylinder 341 is a cylindrical member coupled to the flow path 323. The plunger 342 is a substantially columnar member, and a part of the plunger 342 is provided inside the aspiration delivery cylinder 341. The plunger 342 moves inside the aspiration delivery cylinder 341 in a direction away from the flow path 323, and aspirates the plasticized material into the aspiration delivery cylinder 341 to measure the plasticized material. Then, the plunger 342 moves inside the aspiration delivery cylinder 341 in a direction approaching the flow path 323, and delivers the plasticized material to the flow path 323. The plasticized material delivered to the flow path 323 is press-fed to the nozzle 350, and is injected from the nozzle 350 into the mold 41. The plunger 342 is driven by the plunger drive unit 343 including a motor. An injection amount, an injection speed, and an injection pressure of the plasticized material injected from the nozzle 350 are controlled by controlling the plunger drive unit 343 by the control unit 50.

The mold 41 includes a fixed mold 42 and a movable mold 43. The fixed mold 42 is fixed to the plasticizing unit 30. The movable mold 43 is provided such that the mold clamping device 40 can move the movable mold 43 forward and backward in a mold clamping direction with respect to the fixed mold 42. The plasticized material generated by the plasticizing unit 30 is injected from the nozzle 350 into a cavity defined by the fixed mold 42 and the movable mold 43. The mold 41 may be made of metal, resin, or ceramic. The mold 41 made of metal is also referred to as a metal mold.

The mold clamping device 40 includes a mold drive unit 44. The mold drive unit 44 is implemented by a motor, gears, or the like, and is coupled to the movable mold 43 via a ball screw 45. The mold clamping device 40 rotates the ball screw 45 by driving the mold drive unit 44 under the control of the control unit 50, and moves the movable mold 43 with respect to the fixed mold 42 to open and close the mold 41.

Figure 5:
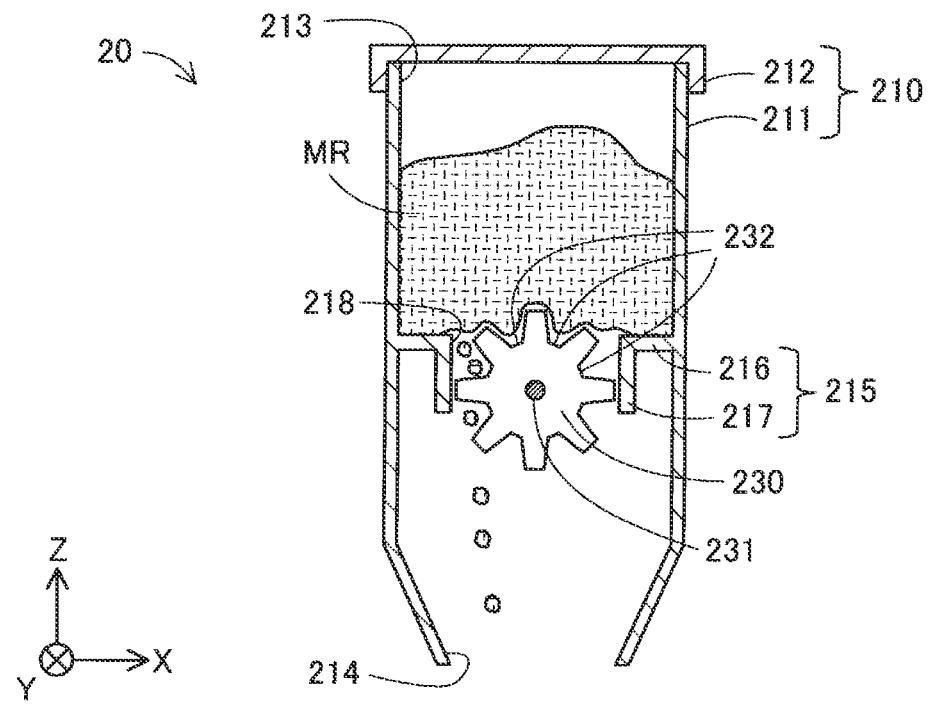
FIG. 5 is a cross-sectional view showing a schematic configuration of a material supply device according to a first embodiment.
Figure 6:
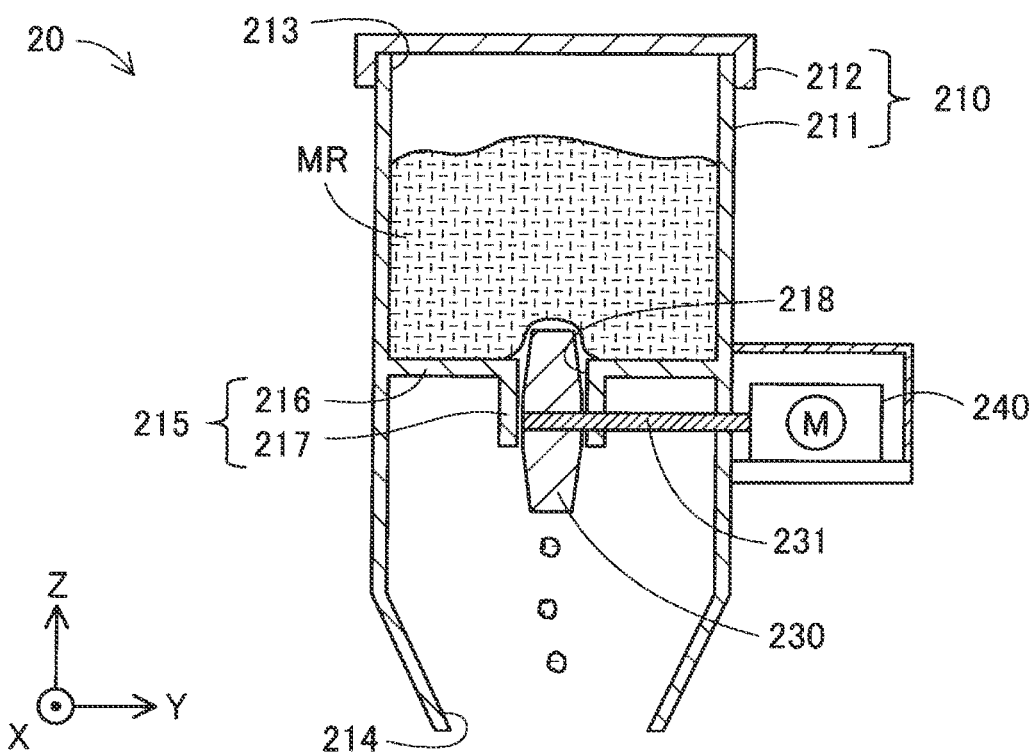
FIG. 6 is a cross-sectional view showing a schematic configuration of the material supply device according to the first embodiment.

FIGS. 5 and 6 are cross-sectional views showing a schematic configuration of the material supply device 20 according to the first embodiment. In the embodiment, the material supply device 20 includes a housing 210 and a rotary member 230.

The housing 210 accommodates a material MR therein. The housing 210 includes a tube portion 211 and a lid 212. The tube portion 211 is a cylindrical member having a frame-shaped cross section perpendicular to the Z direction. The tube portion 211 includes a supply port 213 and an inlet 214. The supply port 213 is an opening at an upper end of the tube portion 211. The inlet 214 is an opening at a lower end of the tube portion 211. The material is supplied from the supply port 213 into the housing 210. The material in the housing 210 is fed into the plasticizing unit 30 through the inlet 214. The lid 212 is placed on the tube portion 211 so as to cover the supply port 213.

The rotary member 230 is provided above the inlet 214 in the housing 210. In the embodiment, the rotary member 230 has a gear shape when viewed from the Y direction. The rotary member 230 is rotatable around a rotation shaft 231 along the Y direction. One end of the rotation shaft 231 is coupled to a center of the rotary member 230, and the other end thereof is coupled to a drive unit 240 provided outside the housing 210. The drive unit 240 is, for example, a motor. The rotary member 230 rotates around the rotation shaft 231 by a driving force applied to the rotation shaft 231 by the drive unit 240. Although the rotary member 230 having a gear shape with eight grooves 232 is shown in FIG. 5, the rotary member 230 may have a gear shape with three to seven, or nine or more grooves 232.

A partition plate 215, which is a part of the housing 210, is formed inside the tube portion 211. The partition plate 215 is formed between the tube portion 211 and the rotary member 230 so as to protrude from an inner surface of the tube portion 211. In the embodiment, the partition plate 215 includes a support portion 216 and a wall portion 217. The support portion 216 is a plate-shaped portion, in which a hole 218 penetrating the support portion 216 in the Z direction is formed, perpendicular to the Z direction. The support portion 216 is provided above the center of the rotary member 230. The wall portion 217 is a portion protruding in the −Z direction from an edge of the hole 218 of the support portion 216. When viewed from the Z direction, the rotary member 230 is located inside the hole 218 of the support portion 216, and is surrounded by the wall portion 217. The partition plate 215 may have a shape that is inclined downward from the inner surface of the tube portion 211 toward the rotary member 230 without the support portion 216 and the wall portion 217.

The material fed from the supply port 213 to the housing 210 is accommodated above the rotary member 230 and the partition plate 215. A part of the material accommodated in the housing 210 enters the grooves 232 of the rotary member 230. When the rotary member 230 rotates around the rotation shaft 231, the material that enters the grooves 232 moves downward together with the grooves 232, is separated from the rotary member 230 due to gravity, and falls into the inlet 214. The material is supplied to the inlet 214 when the rotary member 230 rotates around the rotation shaft 231 and each groove 232 in which the material enters moves downward. Therefore, the material is intermittently supplied to the inlet 214 as the rotary member 230 rotates.

According to the injection molding apparatus 10 of the embodiment described above, as the gear-shaped rotary member 230 rotates around the rotation shaft 231 along the Y direction, the material that enters the grooves 232 of the rotary member 230 falls into the inlet 214, whereby the material is intermittently supplied to the inlet 214. Since a direction in which the rotation shaft 231 extends is different from a gravity direction, when the material enters between the rotary member 230 and the partition plate 215, the material easily falls into the inlet 214 due to the gravity. Accordingly, even when the material enters between the rotary member 230 and the partition plate 215, it is possible to prevent the entering material from inhibiting the rotation of the rotary member 230.

B. Second Embodiment

Figure 7:
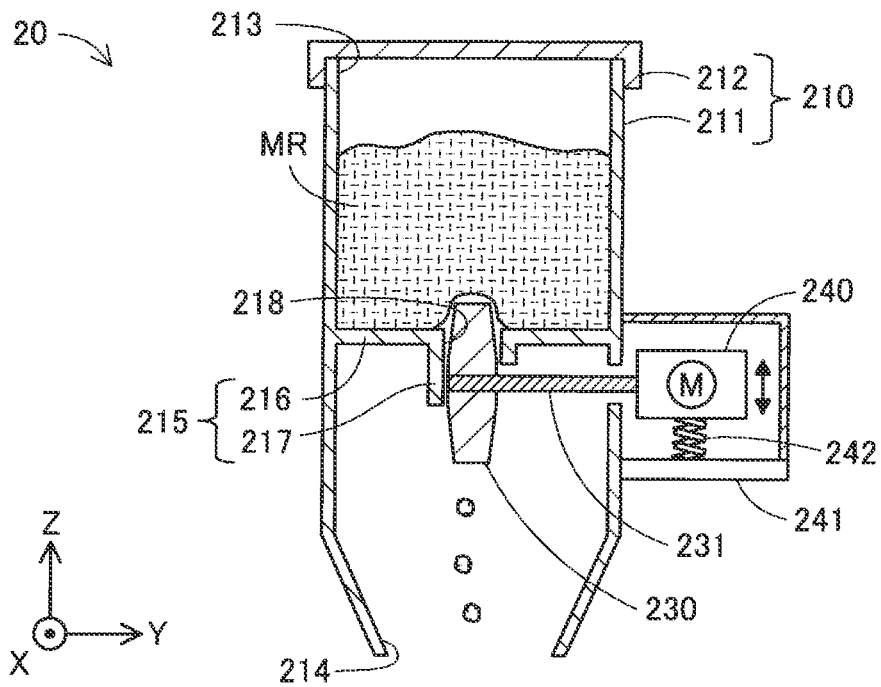
FIG. 7 is a cross-sectional view showing a schematic configuration of a material supply device according to a second embodiment.

FIG. 7 is a cross-sectional view showing a schematic configuration of the material supply device 20 according to a second embodiment. Configurations of the units of the injection molding apparatus 10 other than the material supply device 20 in the second embodiment are the same as those in the first embodiment. In the second embodiment, the material supply device 20 includes the housing 210, the rotary member 230, the drive unit 240, a fixing unit 241, and an extensible member 242.

The fixing unit 241 is fixed to an outer surface of the tube portion 211. A lower end of the extensible member 242 is fixed to an upper surface of the fixing unit 241, and an upper end of the extensible member 242 is fixed to the drive unit 240. That is, the drive unit 240 is supported by the extensible member 242.

The extensible member 242 extends and contracts in the vertical direction. The extensible member 242 is an elastic body such as a spring. The extension and contraction of the extensible member 242 in the vertical direction changes a position of the drive unit 240 in the vertical direction. Since the drive unit 240 is coupled to the rotary member 230 via the rotation shaft 231, a position of the rotary member 230 in the vertical direction changes with the change in the position of the drive unit 240 in the vertical direction.

According to the injection molding apparatus 10 of the second embodiment described above, the position of the drive unit 240 in the vertical direction is changed by the extension and contraction of the extensible member 242 in the vertical direction, and the position of the rotary member 230 coupled to the drive unit 240 in the vertical direction is changed. Accordingly, since the position of the rotary member 230 in the vertical direction is changed in the housing 210, even when the material enters between the rotary member 230 and the partition plate 215, the entering material can easily fall into the inlet 214 due to the gravity, and it is possible to prevent the material from inhibiting the rotation of the rotary member 230.

C. Third Embodiment

Figure 8:
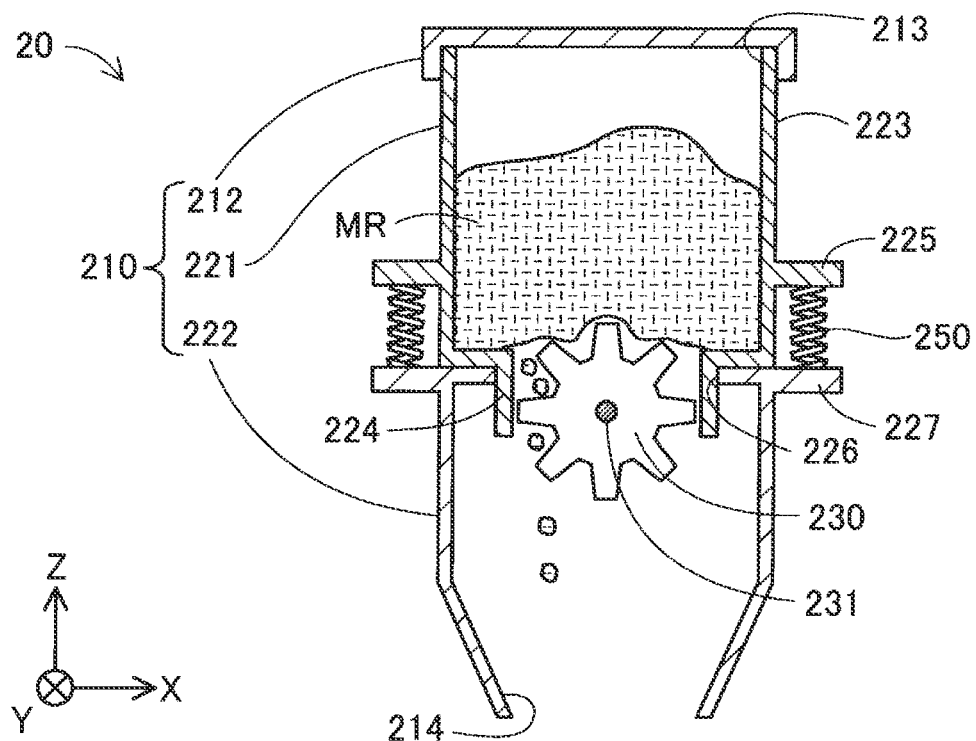
FIG. 8 is a cross-sectional view showing a schematic configuration of a material supply device according to a third embodiment.

FIG. 8 is a cross-sectional view showing a schematic configuration of the material supply device 20 according to a third embodiment. Configurations of the units of the injection molding apparatus 10 other than the material supply device 20 in the third embodiment are the same as those in the first embodiment. In the third embodiment, the material supply device 20 includes the housing 210, the rotary member 230, and extensible portions 250. The housing 210 includes the lid 212, a first housing 221, and a second housing 222.

The first housing 221 includes the supply port 213, an accommodating portion 223, a coupling portion 224, and a first protruding portion 225. The supply port 213 is provided at an upper end of the first housing 221. The accommodating portion 223 accommodates a material therein. The accommodating portion 223 has a box shape having a hole in a bottom surface. The coupling portion 224 is provided below the accommodating portion 223 so as to protrude in the −Z direction from an edge of the hole in the bottom surface of the accommodating portion 223. The rotary member 230 is located inside the coupling portion 224. The first protruding portion 225 protrudes in the X direction from an outer surface of the accommodating portion 223 along the Y direction. The first protruding portion 225 may protrude in the Y direction from the outer surface of the accommodating portion 223 along the X direction.

The second housing 222 is located below the first housing 221. The second housing 222 includes a coupling port 226, the inlet 214, and a second protruding portion 227. The coupling port 226 is a hole formed in an upper surface of the second housing 222, and the coupling portion 224 of the first housing 221 is inserted into the coupling port 226. Since the coupling portion 224 is inserted into the coupling port 226, the first and second housings 221 and 222 communicate with each other. The inlet 214 is provided at a lower end of the second housing 222. The second protruding portion 227 protrudes in the X direction from an outer surface of the second housing 222 along the Y direction. The second protruding portion 227 may protrude in the Y direction from the outer surface of the second housing 222 along the X direction.

The rotation shaft 231 is fixed to the second housing 222 so as to penetrate the second housing 222. The rotary member 230 is fixed to the second housing 222 via the rotation shaft 231.

One end of the extensible portion 250 is fixed to the first protruding portion 225, and the other end thereof is fixed to the second protruding portion 227. The extensible portion 250 is an elastic body such as a spring. The extensible portion 250 extends and contracts in the vertical direction. The extension and contraction of the extensible portion 250 in the vertical direction changes an interval between the first and second housings 221 and 222, and the housing 210 extends and contracts in the vertical direction. In addition, when the extensible portion 250 extends and contracts in the vertical direction, relative positions of the first housing 221 and the rotary member 230 change. In other words, the position of the rotary member 230 in the vertical direction in the housing 210 is changed by the extension and contraction of the extensible portion 250 in the vertical direction. FIG. 8 shows the material supply device 20 in a state where the extensible portion 250 is most contracted. A side surface of the accommodating portion 223 may have, for example, a bellows shape that can extend and contract in the vertical direction.

According to the injection molding apparatus 10 of the third embodiment described above, the extension and contraction of the extensible portion 250 in the vertical direction causes the extension and contraction of the housing 210 in the vertical direction, thereby changing the relative positions of the first housing 221 and the rotary member 230. In addition, when the extensible portion 250 extends and contracts in the vertical direction, relative positions of the coupling portion 224 and the rotary member 230 in the vertical direction change. In addition, when the extensible portion 250 extends and contracts in the vertical direction, the position of the rotary member 230 in the vertical direction in the housing 210 changes. Accordingly, even when the material enters between the rotary member 230 and the coupling portion 224, the entering material can easily fall into the inlet 214 due to the gravity, and it is possible to prevent the material from inhibiting the rotation of the rotary member 230.

D. Fourth Embodiment

Figure 9:
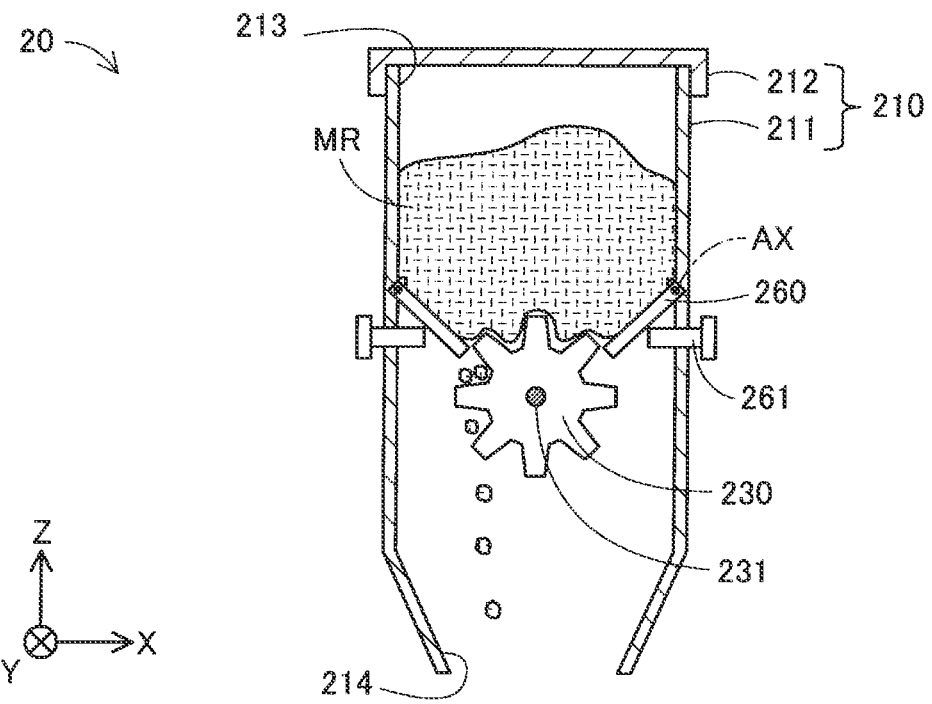
FIG. 9 is a cross-sectional view showing a schematic configuration of a material supply device according to a fourth embodiment.

FIG. 9 is a cross-sectional view showing a schematic configuration of the material supply device 20 according to a fourth embodiment. Configurations of the units of the injection molding apparatus 10 other than the material supply device 20 in the fourth embodiment are the same as those in the first embodiment. In the fourth embodiment, the material supply device 20 includes the housing 210, the rotary member 230, partition members 260, and an adjustment unit 261. The housing 210 includes the lid 212 and the tube portion 211.

The partition members 260 are two plate-shaped members provided between an outer periphery of the rotary member 230 and a side surface of the housing 210. The partition members 260 respectively protrude in directions toward the rotary member 230 from two inner surfaces of the tube portion 211 along the Y direction. The partition members 260 each have a pivot shaft AX. The pivot shaft AX is located at an end portion of the partition member 260 that is attached to the tube portion 211. An axial direction of the pivot shaft AX is a direction along the Y direction. The partition member 260 is pivotable around the pivot shaft AX. The partition member 260 supports a part of the material in the housing 210.

The adjustment unit 261 moves the partition member 260 to adjust an interval between the rotary member 230 and the partition member 260. The adjustment unit 261 is, for example, a screw. The adjustment unit 261 is provided below the partition member 260 so as to penetrate a surface of the tube portion 211 along the Y direction in the X direction. An end portion of the adjustment unit 261 in the vicinity of the rotary member 230 is in contact with a bottom surface of the partition member 260. The adjustment unit 261 is movable in the X direction. When the adjustment unit 261 moves in the X direction, the partition member 260 pivots around the pivot shaft AX, and the interval between the rotary member 230 and the partition member 260 changes. That is, when the adjustment unit 261 moves in the X direction, an interval between the rotary member 230 and an inner edge of the housing 210 changes.

According to the injection molding apparatus 10 of the fourth embodiment described above, when the adjustment unit 261 moves in the X direction, the partition member 260 pivots around the pivot shaft AX, and the interval between the rotary member 230 and the partition member 260 changes. Accordingly, even when the material enters between the rotary member 230 and the partition member 260, the entering material can easily fall into the inlet 214 due to the gravity, and it is possible to prevent the material from inhibiting the rotation of the rotary member 230.

E. Fifth Embodiment

Figure 10:
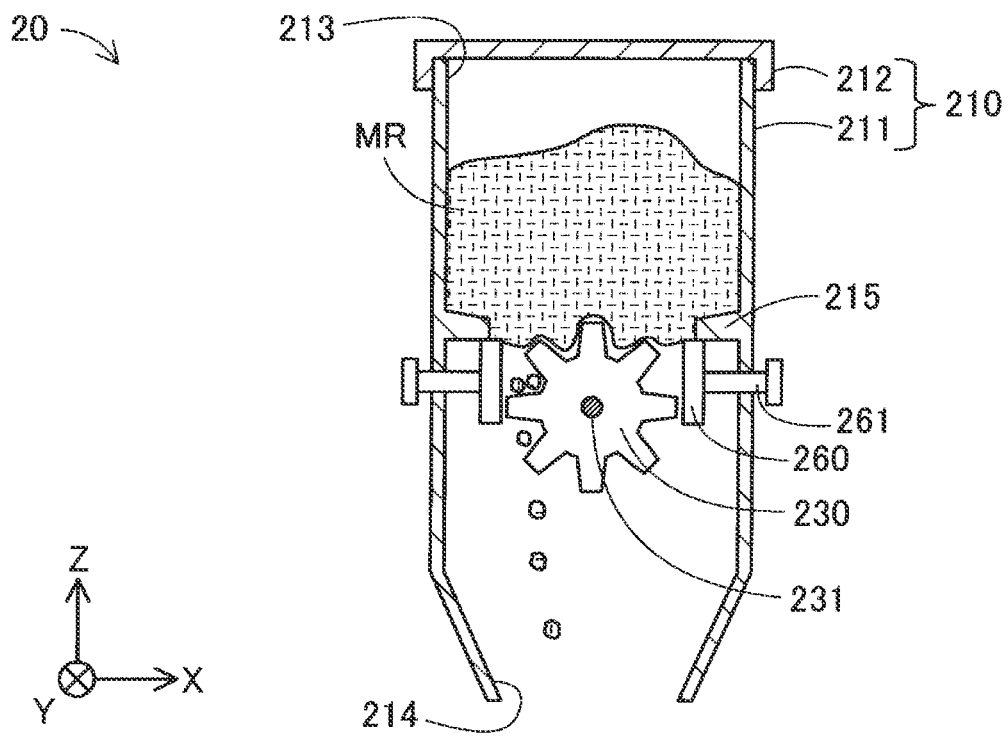
FIG. 10 is a cross-sectional view showing a schematic configuration of a material supply device according to a fifth embodiment.

FIG. 10 is a cross-sectional view showing a schematic configuration of the material supply device 20 according to a fifth embodiment. Configurations of the units of the injection molding apparatus 10 other than the material supply device 20 in the fifth embodiment are the same as those in the fourth embodiment. In the fourth embodiment, the material supply device 20 includes the housing 210, the rotary member 230, the partition members 260, and the adjustment unit 261.

The housing 210 includes the lid 212 and the tube portion 211. The partition plate 215 is formed in the tube portion 211. The partition plate 215 protrudes from the inner surface of the tube portion 211 along the Y direction toward a center of the tube portion 211.

The adjustment unit 261 is provided below the partition plate 215 so as to penetrate a surface of the tube portion 211 along the Y direction in the X direction. The adjustment unit 261 is, for example, a screw. The partition member 260 is provided integrally with the adjustment unit 261 on an end portion of the adjustment unit 261 in the vicinity of the rotary member 230. The adjustment unit 261 is movable in the X direction. When the adjustment unit 261 moves in the X direction, the partition member 260 moves integrally with the adjustment unit 261 in the X direction, and the interval between the rotary member 230 and the partition member 260 changes.

According to the injection molding apparatus 10 of the fifth embodiment described above, when the adjustment unit 261 moves in the X direction, the partition member 260 moves in the X direction, and the interval between the rotary member 230 and the partition member 260 changes. Accordingly, even when the material enters between the rotary member 230 and the partition member 260, the entering material can easily fall into the inlet 214 due to the gravity, and it is possible to prevent the entering material from inhibiting the rotation of the rotary member 230.

F. Sixth Embodiment

Figure 11:
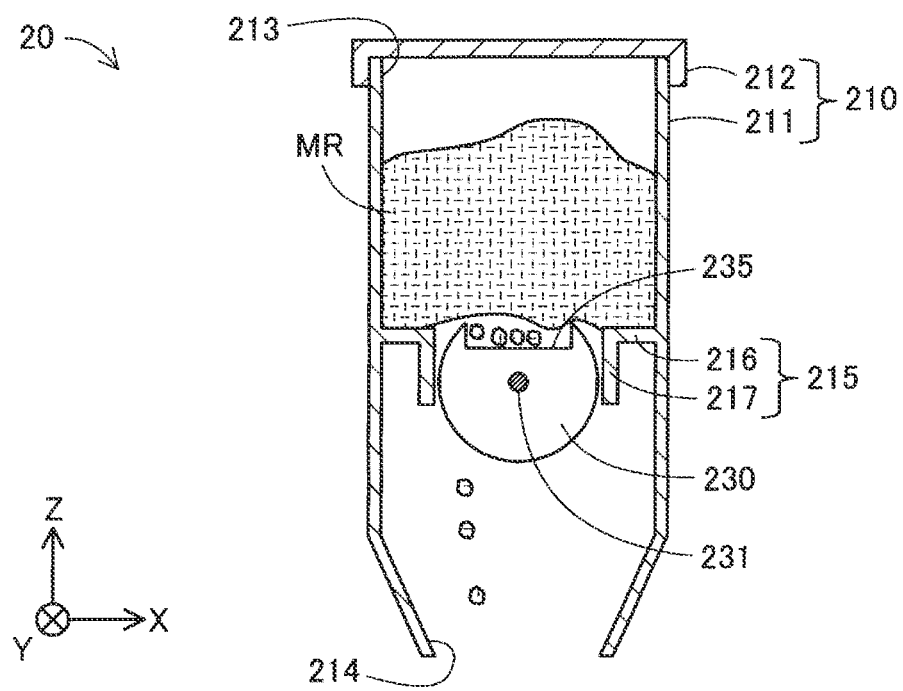
FIG. 11 is a cross-sectional view showing a schematic configuration of a material supply device according to a sixth embodiment.

FIG. 11 is a cross-sectional view showing a schematic configuration of the material supply device 20 according to a sixth embodiment. Configurations of the units of the injection molding apparatus 10 other than the material supply device 20 in the sixth embodiment are the same as those in the first embodiment. Configurations of the units of the material supply device 20 other than the rotary member 230 in the sixth embodiment are the same as those in the first embodiment.

In the sixth embodiment, the rotary member 230 has a recessed portion 235 on the outer periphery. A shape of the rotary member 230 is a shape obtained by cutting out a part of an outer periphery of a column having an axis along the Y direction. The recessed portion 235 is a portion obtained by cutting out a part of the outer periphery of the rotary member 230. Although one recessed portion 235 is formed in the rotary member 230 shown in FIG. 11, two or more recessed portions 235 may be formed in the rotary member 230.

A part of the material accommodated in the housing 210 enters the recessed portion 235 when the recessed portion 235 is located upward. When the rotary member 230 rotates around the rotation shaft, the material that enters the recessed portion 235 moves downward together with the recessed portion 235, is separated from the rotary member 230 due to the gravity, and falls into the inlet 214. The material is supplied to the inlet 214 when the rotary member 230 rotates around the rotation shaft 231 and the recessed portion 235 moves downward. Therefore, the material is intermittently supplied to the inlet 214 as the rotary member 230 rotates.

According to the injection molding apparatus 10 of the sixth embodiment described above, as the rotary member 230 having the recessed portion 235 rotates around the rotation shaft along the Y direction, the material that enters the recessed portion 235 falls into the inlet 214, so that the material is intermittently supplied to the inlet 214. Since the direction in which the rotation axis RX extends is different from the gravity direction, when the material enters between the rotary member 230 and the partition plate 215, the material easily falls into the inlet 214 due to the gravity. Accordingly, even when the material enters between the rotary member 230 and the partition plate 215, it is possible to prevent the entering material from inhibiting the rotation of the rotary member 230.

G. Seventh Embodiment

Figure 12:
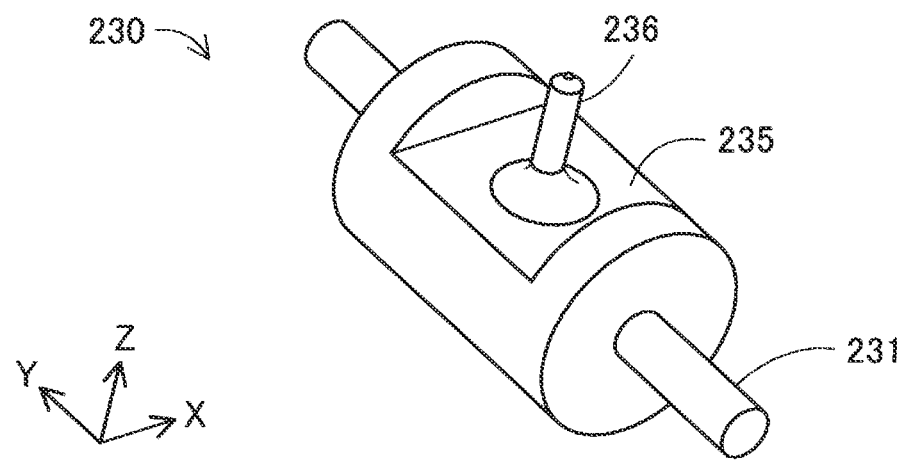
FIG. 12 is a perspective view of a rotary member according to a seventh embodiment.

FIG. 12 is a perspective view of the rotary member 230 according to a seventh embodiment. Configurations of the units of the injection molding apparatus 10 other than the rotary member 230 in the seventh embodiment are the same as those in the sixth embodiment.

In the seventh embodiment, the rotary member 230 includes a protrusion portion 236 in the recessed portion 235. The protrusion portion 236 protrudes from the recessed portion 235 in a radial direction of the rotary member 230. The protrusion portion 236 is a portion having a largest length in the radial direction of the rotary member 230 in the rotary member 230.

According to the injection molding apparatus 10 of the seventh embodiment described above, since the rotary member 230 has the recessed portion 235, as the rotary member 230 rotates around the rotation shaft 231, the material that enters the recessed portion 235 falls into the inlet 214, and thus the material is intermittently supplied to the inlet 214. Since a direction in which the rotation shaft 231 extends is different from a gravity direction, when the material enters between the rotary member 230 and the partition plate 215, the material easily falls into the inlet 214 due to the gravity. Accordingly, even when the material enters between the rotary member 230 and the partition plate 215, it is possible to prevent the material from inhibiting the rotation of the rotary member 230.

Further, in the embodiment, the rotary member 230 includes the protrusion portion 236 in the recessed portion 235, and the protrusion portion 236 has the largest length in the radial direction of the rotary member 230 in the rotary member 230, and thus when the rotary member 230 rotates around the rotation shaft 231, the material plugged between the rotary member 230 and the partition plate 215 can be easily broken or extruded by the protrusion portion 236.

In the embodiment, the protrusion portion 236 may not have the largest length in the radial direction of the rotary member 230 in the rotary member 230. That is, a tip end of the protrusion portion 236 may not protrude in the radial direction beyond a radius of a column constituting the rotary member 230. In this case, when the rotary member 230 rotates around the rotation shaft 231, the material located in the vicinity of the protrusion portion 236 can be stirred.

H. Eighth Embodiment

Figure 13:
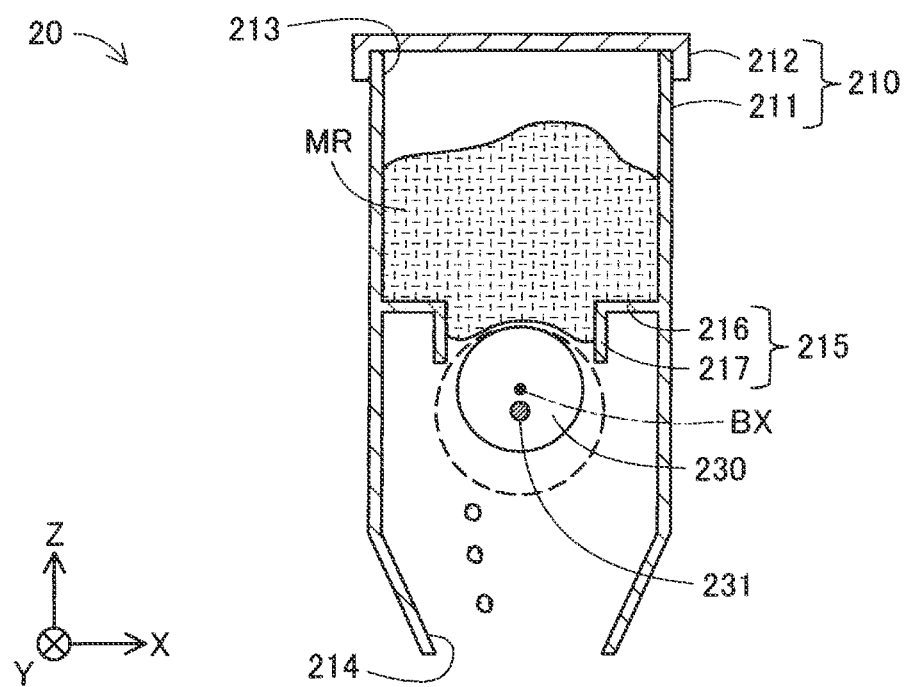
FIG. 13 is a cross-sectional view showing a schematic configuration of a material supply device according to an eighth embodiment.

FIG. 13 is a cross-sectional view showing a schematic configuration of the material supply device 20 according to an eighth embodiment. Configurations of the units of the injection molding apparatus 10 other than the material supply device 20 in the eighth embodiment are the same as those in the first embodiment. Configurations of the units of the material supply device 20 other than the rotary member 230 in the eighth embodiment are the same as those in the first embodiment.

In the eighth embodiment, the shape of the rotary member 230 is a columnar shape having an axis along the Y direction. A center BX of the rotary member 230 coincides with the axis of the rotary member 230. The rotary member 230 is coupled to the rotation shaft 231 such that the center BX thereof is eccentric from the rotation shaft 231. In FIG. 13, a range in which the rotary member 230 moves when the rotary member 230 rotates around the rotation shaft 231 is indicated by a broken line. The partition plate 215 is provided at a position where, when the center BX of the rotary member 230 is located vertically above the rotation shaft 231, the material accommodated in the housing 210 does not fall into the inlet 214 through a gap between the rotary member 230 and the partition plate 215. The interval between the rotary member 230 and the partition plate 215 changes as the rotary member 230 rotates around the rotation shaft 231. That is, the interval between the rotary member 230 and the inner edge of the housing 210 changes as the rotary member 230 rotates around the rotation shaft 231.

When the rotary member 230 rotates around the rotation shaft 231 and the center BX of the rotary member 230 moves from vertically above the rotation shaft 231, the interval between the rotary member 230 and the partition plate 215 increases. The interval between the rotary member 230 and the partition plate 215 is largest when the center BX of the rotary member 230 is located vertically below the rotation shaft 231. When the rotary member 230 rotates around the rotation shaft 231 and the interval between the rotary member 230 and the partition plate 215 is increased, the material accommodated in the housing 210 falls from the gap between the rotary member 230 and the partition plate 215 into the inlet 214. When the rotary member 230 rotates around the rotation shaft 231 and the interval between the rotary member 230 and the partition plate 215 becomes narrow, the falling of the material into the inlet 214 is stopped. Therefore, the material is intermittently supplied to the inlet 214 as the rotary member 230 rotates.

According to the injection molding apparatus 10 of the eighth embodiment described above, the rotary member 230 is coupled to the rotation shaft 231 such that the center BX of the rotary member 230 is eccentric from the rotation shaft 231, and when the rotary member 230 rotates around the rotation shaft, the interval between the rotary member 230 and the partition plate 215 changes, and the material in the housing 210 is intermittently supplied to the inlet 214. Therefore, even when the material enters between the rotary member 230 and the partition plate 215, the rotary member 230 rotates around the rotation shaft 231 to change the interval between the rotary member 230 and the partition plate 215, so that the entering material can easily fall into the inlet 214. In addition, since the direction in which the rotation shaft 231 extends is different from the gravity direction, when the material enters between the rotary member 230 and the partition plate 215, the material easily falls into the inlet 214 due to the gravity. Accordingly, even when the material enters between the rotary member 230 and the partition plate 215, it is possible to prevent the entering material from inhibiting the rotation of the rotary member 230.

I. Ninth Embodiment

Figure 14:
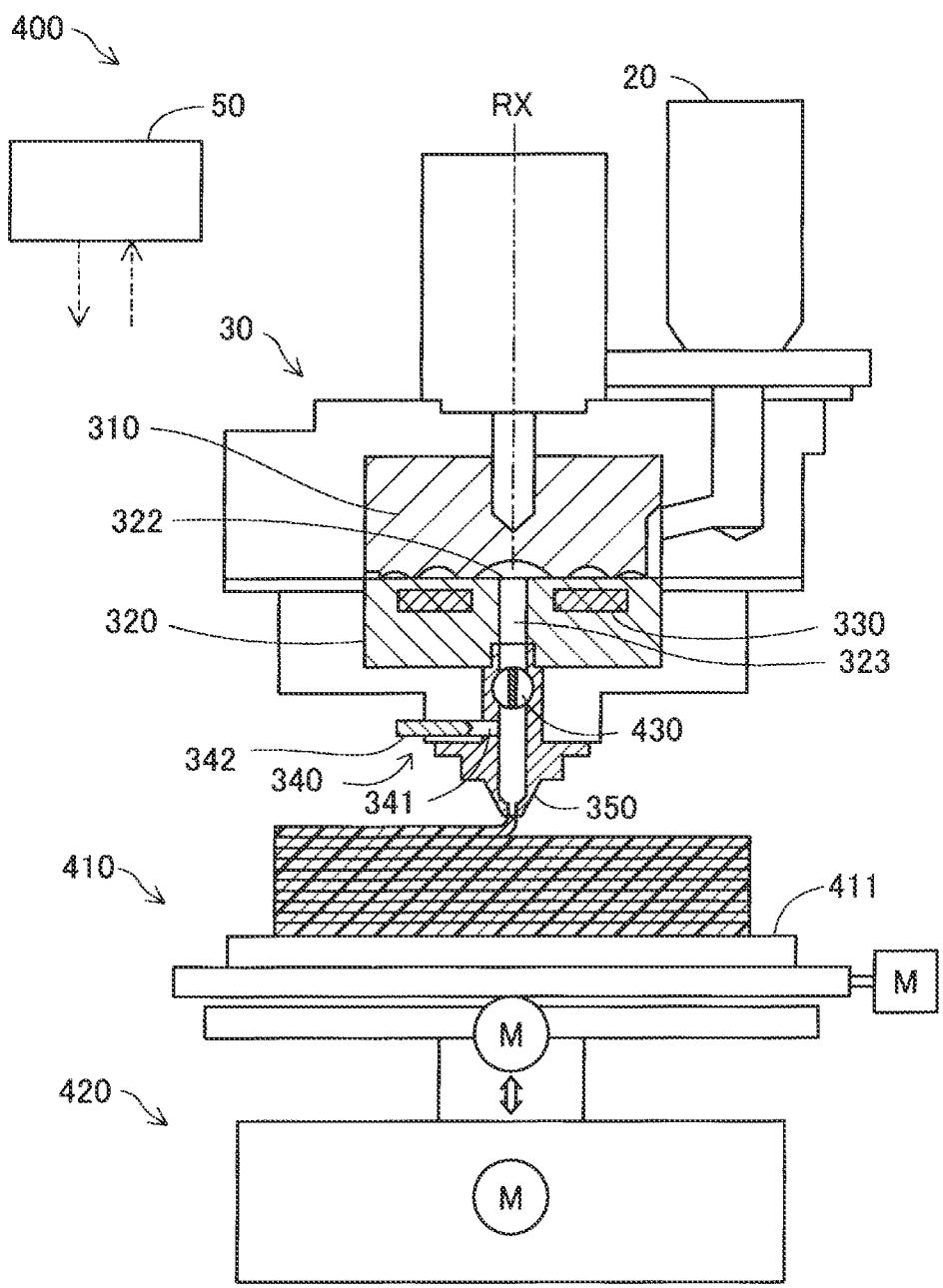
FIG. 14 shows a schematic configuration of a three-dimensional shaping apparatus according to a ninth embodiment.

FIG. 14 shows a schematic configuration of a three-dimensional shaping apparatus 400 according to a ninth embodiment. The three-dimensional shaping apparatus 400 includes the material supply device 20, the plasticizing unit 30, a shaping stage 410, and a moving mechanism 420. The material supply device 20 according to the embodiment has the same configuration as that of the first embodiment.

The plasticizing unit 30 includes the flat screw 310, the barrel 320, the heating unit 330, and the aspiration delivery unit 340. In the embodiment, a valve 430, which switches a discharge amount of the plasticized material from the nozzle 350 or whether the plasticized material is discharged, is provided, instead of the check valve 324, in a flow path 323 that couples the communication hole 322 of the barrel 320 and the nozzle 350. The valve 430 is driven under control of the control unit 50. Other configurations of the plasticizing unit 30 are the same as those of the plasticizing unit 30 in the first embodiment.

The shaping stage 410 faces the nozzle 350. The plasticized material discharged from the nozzle 350 is deposited on a shaping surface 411 on the stage. In the embodiment, the shaping surface 411 is along a horizontal direction. The shaping stage 410 is supported by the moving mechanism 420.

The moving mechanism 420 changes a relative position between the nozzle 350 and the shaping stage 410. In the embodiment, the moving mechanism 420 changes the relative position between the nozzle 350 and the shaping stage 410 by moving the shaping stage 410. The moving mechanism 420 in the embodiment is implemented by a three-axis positioner that moves the shaping stage 410 in three axial directions of the X, Y, and Z directions by power generated by three motors. Each motor is driven under the control of the control unit 50. The moving mechanism 420 may change the relative position between the nozzle 350 and the shaping stage 410 by moving the plasticizing unit 30 without moving the shaping stage 410. Further, the moving mechanism 420 may change the relative position between the nozzle 350 and the shaping stage 410 by moving both the shaping stage 410 and the plasticizing unit 30.

Under the control of the control unit 50, the three-dimensional shaping apparatus 400 discharges the plasticized material from the nozzle 350 while changing the relative position between the nozzle 350 and the shaping stage 410, thereby stacking a layer of the plasticized material on the shaping stage 410 to shape a three-dimensional shaped object having a desired shape. When temporarily stopping the discharge of the plasticized material from the nozzle 350 using the valve 430, the control unit 50 drives the plunger 342 provided in the aspiration delivery unit 340 to aspirate the plasticized material around the nozzle into the aspiration delivery cylinder 341. When the discharge of the plasticized material from the nozzle 350 is restarted using the valve 430, the plunger 342 is driven to press-feed the plasticized material aspirated into the aspiration delivery cylinder 341 toward the nozzle 350.

According to the three-dimensional shaping apparatus 400 in the ninth embodiment described above, similarly to the first embodiment, when the material enters between the rotary member 230 and the partition plate 215, the material can easily fall into the inlet 214 due to the gravity, and it is possible to prevent the material from inhibiting the rotation of the rotary member 230.

In the embodiment, the material supply device 20 may include the extensible member 242 described in the second embodiment, may include the extensible portion 250 described in the third embodiment, or may include the partition member 260 and the adjustment unit 261 described in the fourth embodiment or the fifth embodiment. In the embodiment, the rotary member 230 may have the recessed portion 235 described in the sixth embodiment, or may have the protrusion portion 236 described in the seventh embodiment inside the recessed portion 235, or the rotation shaft 231 may be eccentric from the center BX of the rotary member 230 as described in the eighth embodiment.

J. Other Embodiments (J-1) In the first embodiment, the sixth embodiment, and the seventh embodiment, when the outer periphery of the rotary member 230 is adjacent to the inner surface of the tube portion 211, the partition plate 215 may not be formed in the tube portion 211.

(J-2) In the first to fifth embodiments, the rotary member 230 may have a shape in which a part of the column having the axis along the Y direction is cut off in the Y direction.

Figure 15:
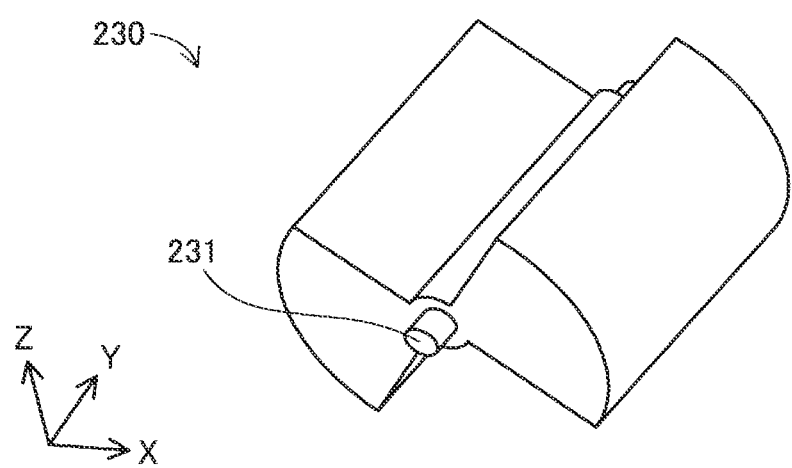
FIG. 15 shows an example of a shape of the rotary member.

(J-3) FIG. 15 shows an example of the shape of the rotary member 230. In the first to fifth embodiments, the rotary member 230 may have the shape as shown in FIG. 15.

(J-4) In the sixth and seventh embodiments, corners of the recessed portion 235 may be rounded. In this case, it is possible to prevent accumulation of a material having a small particle size at the corners of the recessed portion 235.

(J-5) In the above embodiments, the rotation shaft 231 is provided in the direction along the Y direction. Alternatively, the rotation shaft 231 may be provided in a direction intersecting the vertical direction.

(J-6) In the above-described embodiments, the injection molding apparatus 10 may not include a part or all of the plasticizing unit 30, the mold clamping device 40, and the control unit 50.

(J-7) In the above-described embodiment, the three-dimensional shaping apparatus 400 may not include a part or all of the plasticizing unit 30, the shaping stage 410, and the moving mechanism 420.

K. Other Embodiments

The present disclosure is not limited to the embodiments described above, and can be implemented in various forms without departing from the spirit of the present disclosure. For example, the present disclosure can be implemented in the following aspects. To solve a part of or all of problems of the present disclosure, or to achieve a part of or all of effects of the present disclosure, technical features of the embodiments described above corresponding to technical features in the following aspects can be replaced or combined as appropriate. Technical features can be deleted as appropriate unless the technique features are described as essential in the present specification.

(1) According to an aspect of the present disclosure, a material supply device that supplies a material to a plasticizing unit, the plasticizing unit being configured to plasticize the material to generate a plasticized material, is provided. The material supply device includes: a housing having an inlet through which the material is fed into the plasticizing unit, and accommodating the material, and a rotary member provided above the inlet in the housing and configured to rotate around a rotation shaft intersecting a vertical direction. The material is accommodated above the rotary member in the housing, and the material is intermittently supplied to the inlet by the rotation of the rotary member. According to such an aspect, since the rotary member rotates around the rotation shaft intersecting with the vertical direction, even when the material enters between the rotary member and the housing, the material can easily fall into the inlet due to the gravity, and it is possible to prevent the material from inhibiting the rotation of the rotary member.

(2) In the above aspect, the rotary member may have a recessed portion on an outer periphery. According to such an aspect, when the rotary member rotates around the rotation shaft and the recessed portion moves downward, the material in the recessed portion is supplied to the inlet, and thus the material can be intermittently supplied to the inlet.

(3) In the above aspect, a protrusion portion may be provided in the recessed portion. According to such an aspect, when the material is plugged between the rotary member and the housing, the plugged material can be broken by the protrusion portion. When the rotary member rotates around the rotation shaft, the material located in the vicinity of the protrusion portion can be stirred.

(4) In the above aspect, the rotation shaft may be eccentric from a center of the rotary member, and the material may be intermittently supplied to the inlet by a change in an interval between the rotary member and the housing when the rotary member rotates. According to such an aspect, since the shape of the rotary member can be simplified, maintenance of the rotary member can be simplified.

(5) In the above aspect, the material supply device may further include a drive unit configured to rotate the rotation shaft, and an extensible member supporting the drive unit and configured to extend and contract in the vertical direction. When the extensible portion extends and contracts in the vertical direction, a position of the rotary member in the vertical direction in the housing may change. According to such an aspect, by changing the position of the rotary member in the vertical direction in the housing, the material plugged between the rotary member and the housing can easily fall into the inlet due to the gravity.

(6) In the above aspect, the housing may include a first housing and a second housing located below the first housing, and the material may be accommodated in the first housing. The material supply device may further include: an extensible portion of which one end is fixed to the first housing, and the other end is fixed to the second housing. The extensible portion may extend and contract the housing in the vertical direction to change a position of the rotary member in the housing in the vertical direction. According to such an aspect, by changing the position of the rotary member in the vertical direction in the housing, the material plugged between the rotary member and the housing can easily fall into the inlet due to the gravity.

(7) In the above aspect, the material supply device may further include: a partition member provided between an outer periphery of the rotary member and a side surface of the housing, and supporting a part of the material; and an adjustment unit configured to move the partition member to adjust an interval between the rotary member and the partition member. According to such an aspect, the interval between the rotary member and the partition member can be adjusted based on a size and hardness of the material accommodated in the housing.

(8) A second aspect of the present disclosure provides a plasticizing apparatus. The plasticizing apparatus includes the material supply device and the plasticizing unit.

The present disclosure may be implemented in various aspects other than the material supply device and the plasticizing apparatus. For example, the present disclosure can be implemented in the aspect of an injection molding apparatus or a three-dimensional shaping apparatus.

What is claimed is:

1. A material supply device that supplies a material to a plasticizing unit, the plasticizing unit being configured to plasticize the material to generate a plasticized material, the material supply device comprising:
 a housing having an inlet through which the material is fed into the plasticizing unit, and accommodating the material;
 a rotary member provided above the inlet in the housing and configured to rotate around a rotation shaft intersecting a vertical direction, wherein
 the material is accommodated above the rotary member in the housing, and
 the material is intermittently supplied to the inlet by the rotation of the rotary member;
 a drive unit configured to rotate the rotation shaft; and
 an extensible member supporting the drive unit and configured to extend and contract in the vertical direction, wherein when the extensible member extends and contracts in the vertical direction, a position of the rotary member in the vertical direction in the housing and a position of the drive unit in the vertical direction changes.

* * * * *